(12) United States Patent
Chen et al.

(10) Patent No.: US 10,385,242 B2
(45) Date of Patent: Aug. 20, 2019

(54) ADHESIVE COMPOSITIONS CONTAINING MODIFIED ETHYLENE-BASED POLYMERS

(71) Applicant: Dow Global Technologies LLC, Midland, MI (US)

(72) Inventors: Livia L. Chen, Shanghai (CN); Selim Yalvac, Pearland, TX (US); Cynthia L. Rickey, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 83 days.

(21) Appl. No.: 14/408,152

(22) PCT Filed: Mar. 14, 2013

(86) PCT No.: PCT/US2013/031456
§ 371 (c)(1),
(2) Date: Dec. 15, 2014

(87) PCT Pub. No.: WO2013/187968
PCT Pub. Date: Dec. 19, 2013

(65) Prior Publication Data
US 2015/0166853 A1    Jun. 18, 2015

(30) Foreign Application Priority Data

Jun. 15, 2012 (WO) ................ PCT/CN2012/076986

(51) Int. Cl.
| | | |
|---|---|---|
| *C09J 151/00* | (2006.01) | |
| *C09J 7/02* | (2006.01) | |
| *C09J 7/04* | (2006.01) | |
| *C09J 123/08* | (2006.01) | |
| *C09J 11/08* | (2006.01) | |
| *C08L 23/08* | (2006.01) | |
| *C09J 7/35* | (2018.01) | |
| *C09J 7/29* | (2018.01) | |
| *C09J 7/21* | (2018.01) | |

(52) U.S. Cl.
CPC ....... *C09J 151/003* (2013.01); *C08L 23/0815* (2013.01); *C09J 7/21* (2018.01); *C09J 7/29* (2018.01); *C09J 7/35* (2018.01); *C09J 11/08* (2013.01); *C09J 123/0815* (2013.01); *C09J 151/00* (2013.01); *C09J 2201/122* (2013.01); *C09J 2201/61* (2013.01); *C09J 2400/283* (2013.01); *C09J 2423/04* (2013.01); *C09J 2451/00* (2013.01); *Y02P 20/582* (2015.11); *Y10T 428/2878* (2015.01)

(58) Field of Classification Search
CPC ............. C09J 151/06; C09J 11/08; C09J 9/00
See application file for complete search history.

(56) References Cited

U.S. PATENT DOCUMENTS

| | | | |
|---|---|---|---|
| 5,272,236 A | 12/1993 | Lai et al. | |
| 5,763,516 A | 6/1998 | Godfrey | |
| 6,300,398 B1 * | 10/2001 | Jialanella | ............ C08L 23/0815 524/275 |
| 6,335,410 B1 | 1/2002 | Finlayson et al. | |
| 2007/0146875 A1 | 6/2007 | Niwa et al. | |
| 2010/0160497 A1 | 6/2010 | Karjala et al. | |

FOREIGN PATENT DOCUMENTS

| | | |
|---|---|---|
| WO | 2011153540 A1 | 12/2011 |
| WO | 2015/013472 A1 | 1/2015 |

OTHER PUBLICATIONS

PCT/US2013/031456, International Search Report and Written Opinion dated Jul. 4, 2013, pp. 1-9.
PCT/ US2013/031456, International Preliminary Report on Patentability, dated Dec. 16, 2014, pp. 1-7.
PCT/CN2012/076986, International Search Report and Written Opinion, dated Mar. 1, 2013, pp. 1-8.
PCT/ CN2012/076986, International Preliminary Report on Patentability, dated Dec. 16, 2014, pp. 1-5.
International Application No. PCT/CN2014/084914, with a filing date of Aug. 21, 2014.
International Application No. PCT/CN2014/072208, with a filing date of Dec. 23, 2014.

\* cited by examiner

*Primary Examiner* — Cheng Yuan Huang
(74) *Attorney, Agent, or Firm* — Husch Blackwell LLP

(57) ABSTRACT

The invention provides a composition comprising the following: A) an anhydride and/or carboxylic acid functionalized ethylene/alpha-olefin interpolymer having the following properties: i) a melt viscosity (177° C.) less than, or equal to, 50,000 cP, ii) MWD from 1.5 to 5, and iii) a density from 0.855 to 0.900 g/cc; B) a tackifier; and C) a wax.

8 Claims, No Drawings

ADHESIVE COMPOSITIONS CONTAINING MODIFIED ETHYLENE-BASED POLYMERS

REFERENCE TO RELATED APPLICATIONS

This application claims priority to International Application No. PCT/CN12/076986, filed on Jun. 15, 2012.

BACKGROUND

Hot melt adhesives based on polyolefins have experienced considerable growth over the last decade, due to their good performance, processability, and, in some cases, cost benefits. Adhesive formulations are disclosed in U.S. Publication 2010/0160497. However, despite their success, there have been occasional pockets of applications where the adhesion to certain "hard-to-bond" substrates has been challenging. Such substrates typically include coated substrates and substrates made from recycled paper. More specifically, the "hard-to-bond" substrates are represented by materials such as clay coatings, wax coatings, polyethylene films and coatings, polypropylene films and coatings, Bi-axially Oriented Polypropylene (BOPP), polyethylene terephthalate (PET), or lacquer-coated Kraft paper. Since these substrates are aesthetically more appealing, they are becoming, increasingly, the substrates of choice for many companies for marketing purposes. There is a need for new adhesive compositions that have improved adhesion to "hard-to-bond" substrates." These needs have been met by the following invention.

SUMMARY OF THE INVENTION

The invention provides a composition comprising the following:
A) an anhydride and/or carboxylic acid functionalized ethylene/alpha-olefin interpolymer having the following properties:
  i) a melt viscosity (177° C.) less than, or equal to, 50,000 cP,
  ii) MWD from 1.5 to 5, and
  iii) a density from 0.855 to 0.900 g/cc;
B) a tackifier; and
C) a wax.

DETAILED DESCRIPTION

As discussed above, the invention provides a composition comprising the following:
A) an anhydride and/or carboxylic acid functionalized ethylene/alpha-olefin interpolymer having the following properties:
  i) a melt viscosity (177° C.) less than, or equal to, 50,000 cP,
  ii) MWD from 1.5 to 5, and
  iii) a density from 0.855 to 0.900 g/cc;
B) a tackifier; and
C) a wax.

The inventive composition may comprise a combination of two or more embodiments as described herein.

In one embodiment, the anhydride and/or carboxylic acid functionalized ethylene/alpha-olefin interpolymer is an anhydride and/or carboxylic acid functionalized ethylene/alpha-olefin copolymer. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

In one embodiment, component A is an anhydride and carboxylic acid functionalized ethylene/alpha-olefin interpolymer. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer of Component A comprises greater than, or equal to, 0.5 weight percent, further greater than, or equal to, 0.7 weight percent, further greater than, or equal to, 0.8 weight percent, further greater than, or equal to, 0.9 weight percent, and further greater than, or equal to, 1.0 weight percent of the anhydride and/or carboxylic acid functionality, based on the weight of the polymer. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer of Component A comprises from 0.9 to 1.5 weight percent, further from 0.9 to 1.4 weight percent, further from 0.9 to 1.3 weight percent of the anhydride and/or carboxylic acid functionality, based on the weight of the polymer. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer of Component A has a melt viscosity less than, or equal to, 40,000 cP, further less than, or equal to, 30,000 cP, further less than, or equal to, 20,000 cP, and further less than, or equal to, 15,000 cP, at 350° F. (177° C.). In a further embodiment, the anhydride and/or carboxylic acid functionalized ethylene/alpha-olefin interpolymer is an anhydride and/or carboxylic acid functionalized ethylene/α-olefin copolymer.

In one embodiment, anhydride and/or carboxylic acid functionalized ethylene/alpha-olefin interpolymer of Component A has a melt viscosity greater than, or equal to, 2,000 cP, further greater than, or equal to, 3,000 cP, further greater than, or equal to, 4,000 cP, and further greater than, or equal to, 5,000 cP, at 350° F. (177° C.). In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a melt viscosity from 2,000 cP to 50,000 cP, further from 3,000 cP to 40,000 cP, further from 4,000 cP to 30,000 cP, at 350° F. (177° C.), and further from 5,000 cP to 20,000 cP, at 350° F. (177° C.). In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a molecular weight distribution (Mw/Mn) less than, or equal to, 5.0, further less than, or equal to, 4.0, further less than, or equal to, 3.0, and further less than, or equal to, 2.5. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a molecular weight distribution (Mw/Mn) less than, or equal to, 3.0, further less than, or equal to, 2.9, further less than, or equal to, 2.8. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a molecular weight distribution (Mw/Mn) greater than, or equal to, 1.1, further greater than, or equal to, 1.3, and further greater than, or equal to, 1.5. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a molecular weight distribution (Mw/Mn) greater than, or equal to, 2.0, further greater than, or equal to, 2.2, and further greater than, or equal to, 2.5. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a weight average molecular weight (Mw) less than, or equal to, 50,000 g/mole, further less than, or equal to, 40,000 g/mole, further less than, or equal to, 30,000 g/mole. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a weight average molecular weight (Mw) greater than, or equal to, 2000 g/mole, further greater than, or equal to, 3000 g/mole, further greater than, or equal to, 4000 g/mole. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a melt index (I2), or calculated melt index (I2), greater than, or equal to, 300 g/10 min, further greater than, or equal to, 400 g/10 min, and more further greater than, or equal to, 500 g/10 min In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a melt index (I2), or calculated melt index (I2), less than, or equal to, 1500 g/10 min, further less than, or equal to, 1200 g/10 min, and more further less than, or equal to, 1000 g/10 min. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a percent crystallinity of less than, or equal to, 40 percent, further less than, or equal to, 35 percent, further less than, or equal to, 30 percent, further less than, or equal to, 25 percent, and further less than, or equal to, 20 percent, as determined by DSC. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a percent crystallinity of greater than, or equal to, 2 percent, further greater than, or equal to, 5 percent, and further greater than, or equal to, 10 percent, as determined by DSC. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a density greater than, or equal to, 0.850 g/cc, further greater than, or equal to, 0.855 g/cc, add further greater than, or equal to, 0.860 g/cc. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a density less than, or equal to, 0.900 g/cc, further less than, or equal to, 0.895 g/cc, and further less than, or equal to, 0.890 g/cc. In a further embodiment, the anhydride and/or carboxylic acid functionalized ethylene/alpha-olefin interpolymer is an anhydride and/or carboxylic acid functionalized ethylene/α-olefin copolymer.

In one embodiment, the anhydride and/or carboxylic acid functionalized ethylene/alpha-olefin interpolymer has a density from 0.855 $g/cm^3$ to 0.900 $g/cm^3$, further from 0.860 $g/cm^3$ to 0.895 $g/cm^3$, and further from 0.865 $g/cm^3$ to 0.890 $g/cm^3$. In a further embodiment, the anhydride and/or carboxylic acid functionalized ethylene/alpha-olefin interpolymer is an anhydride and/or carboxylic acid functionalized ethylene/α-olefin copolymer.

Suitable functionalized copolymers include MAH-grafted copolymers (for example, AFFINITY GA 1000R Polyolefin Plastomer, available from The Dow Chemical Company).

In one embodiment, the composition comprises from 20 to 60 weight percent, and further from 30 to 50 weight percent of component A, based on the weight of the composition.

An anhydride and/or carboxylic acid functionalized ethylene/alpha-olefin interpolymer may comprise a combination of two or more embodiments as described herein.

An anhydride and/or carboxylic acid functionalized ethylene/alpha-olefin copolymer may comprise a combination of two or more embodiments as described herein.

In one embodiment, the composition further comprises component D) an ethylene/alpha-olefin interpolymer, and further an ethylene/alpha-olefin copolymer. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

In one embodiment, the ethylene/alpha-olefin interpolymer of component D has at least one of the following properties:
  i) a melt viscosity (177° C.) less than 50,000 cP,
  ii) MWD from 1.2 to 3, and
  iii) a density from 0.855 to 0.900 g/cc. In a further embodiment, the ethylene/alpha-olefin interpolymer is an ethylene/alpha-olefin copolymer.

In one embodiment, the ethylene/alpha-olefin interpolymer of component D has at least two of the following properties:
i) a melt viscosity (177° C.) less than 50,000 cP,
ii) MWD from 1.2 to 3, and
iii) a density from 0.855 to 0.900 g/cc. In a further embodiment, the ethylene/alpha-olefin interpolymer is an ethylene/alpha-olefin copolymer.

In one embodiment, the ethylene/alpha-olefin interpolymer of component D has the following properties:
i) a melt viscosity (177° C.) less than 50,000 cP,
ii) MWD from 1.2 to 3, and
iii) a density from 0.855 to 0.900 g/cc. In a further embodiment, the ethylene/alpha-olefin interpolymer is an ethylene/alpha-olefin copolymer.

In one embodiment, the ethylene/alpha-olefin interpolymer of Component D has a melt viscosity less than, or equal to, 40,000 cP, further less than, or equal to, 30,000 cP, further less than, or equal to, 20,000 cP, and further less than, or equal to, 15,000 cP, at 350° F. (177° C.). In a further embodiment, the ethylene/alpha-olefin interpolymer is an ethylene/α-olefin copolymer.

In one embodiment, ethylene/alpha-olefin interpolymer of Component D has a melt viscosity greater than, or equal to, 2,000 cP, further greater than, or equal to, 3,000 cP, further greater than, or equal to, 4,000 cP, and further greater than, or equal to, 5,000 cP, at 350° F. (177° C.). In a further embodiment, the ethylene/alpha-olefin interpolymer is an ethylene/α-olefin copolymer.

In one embodiment, the ethylene/alpha-olefin interpolymer of component D has a melt viscosity from 2,000 cP to 50,000 cP, further from 3,000 cP to 40,000 cP, further from 4,000 cP to 30,000 cP, at 350° F. (177° C.), and further from 5,000 cP to 20,000 cP, at 350° F. (177° C.). In a further embodiment, the ethylene/alpha-olefin interpolymer is an ethylene/α-olefin copolymer.

In one embodiment, the ethylene/alpha-olefin interpolymer of component D has a molecular weight distribution (Mw/Mn) less than, or equal to, 3.5, further less than, or equal to, 3.0, further less than, or equal to, 2.5, and further less than, or equal to, 2.3. In a further embodiment, the ethylene/alpha-olefin interpolymer is an ethylene/α-olefin copolymer.

In one embodiment, the ethylene/alpha-olefin interpolymer of component D has a molecular weight distribution (Mw/Mn) greater than, or equal to, 1.1, further greater than, or equal to, 1.3, further greater than, or equal to, 1.5, and further greater than, or equal to, 1.7. In a further embodiment, the ethylene/alpha-olefin interpolymer is an ethylene/α-olefin copolymer.

In one embodiment, the ethylene/alpha-olefin interpolymer of component D has a weight average molecular weight distribution (Mw) less than, or equal to, 40,000 g/mole, further less than, or equal to, 30,000 g/mole, further less than, or equal to, 25,000 g/mole. In a further embodiment, the ethylene/alpha-olefin interpolymer is an ethylene/α-olefin copolymer.

In one embodiment, the ethylene/alpha-olefin interpolymer of component D has a weight average molecular weight distribution (Mw) greater than, or equal to, 2000 g/mole, further greater than, or equal to, 3000 g/mole, further greater than, or equal to, 4000 g/mole. In a further embodiment, the ethylene/alpha-olefin interpolymer is an ethylene/α-olefin copolymer.

In one embodiment, the ethylene/alpha-olefin interpolymer of component D has a melt index (I2 or MI), or calculated melt index (I2 or MI), greater than, or equal to, 400 g/10 min, further greater than, or equal to, 600 g/10 min, and more further greater than, or equal to, 800 g/10 min In a further embodiment, the ethylene/alpha-olefin interpolymer is an ethylene/α-olefin copolymer.

In one embodiment, the ethylene/alpha-olefin interpolymer of component D has a melt index (I2 or MI), or calculated melt index (I2 or MI), less than, or equal to, 2000 g/10 min, further less than, or equal to, 1500 g/10 min, and further less than, or equal to, 1200 g/10 min. In a further embodiment, the ethylene/alpha-olefin interpolymer is an ethylene/α-olefin copolymer.

In one embodiment, the ethylene/alpha-olefin interpolymer of component D has a percent crystallinity of less than, or equal to, 40 percent, further less than, or equal to, 35 percent, further less than, or equal to, 30 percent, further less than, or equal to, 25 percent, and further less than, or equal to, 20 percent, as determined by DSC. In a further embodiment, the ethylene/alpha-olefin interpolymer is an ethylene/α-olefin copolymer.

In one embodiment, the ethylene/alpha-olefin interpolymer of component D has a percent crystallinity of greater than, or equal to, 2 percent, further greater than, or equal to, 5 percent, and further greater than, or equal to, 10 percent, as determined by DSC. In a further embodiment, the ethylene/alpha-olefin interpolymer is an ethylene/α-olefin copolymer.

In one embodiment, the ethylene/alpha-olefin interpolymer of component D has a density greater than, or equal to, 0.855 g/cc, further greater than, or equal to, 0.860 g/cc, add further greater than, or equal to, 0.865 g/cc. In a further embodiment, the ethylene/alpha-olefin interpolymer is an ethylene/α-olefin copolymer.

In one embodiment, the ethylene/alpha-olefin interpolymer of component D has a density less than, or equal to, 0.900 g/cc, further less than, or equal to, 0.895 g/cc, and further less than, or equal to, 0.890 g/cc. In a further embodiment, the ethylene/alpha-olefin interpolymer is an ethylene/α-olefin copolymer.

In one embodiment, the ethylene/alpha-olefin interpolymer of component D has a density from 0.855 g/cm$^3$ to 0.900 g/cm$^3$, further from 0.860 g/cm$^3$ to 0.895 g/cm$^3$, and further from 0.865 g/cm$^3$ to 0.890 g/cm$^3$. In a further embodiment, the ethylene/alpha-olefin interpolymer is an ethylene/α-olefin copolymer.

In one embodiment, the ethylene/α-olefin interpolymer of component D is a homogeneously branched linear interpolymer, and preferably a copolymer, or a homogeneous branched substantially linear interpolymer, and preferably a copolymer.

In one embodiment, the ethylene/α-olefin interpolymer of component D is a homogeneously branched linear interpolymer, and preferably a copolymer.

In one embodiment, the ethylene/α-olefin interpolymer of component D is a homogeneous branched substantially linear interpolymer, and preferably a copolymer.

Some examples of ethylene/α-olefin interpolymers include AFFINITY GA Polyolefin Plastomers, available from The Dow Chemical Company, and LICOCENE Performance Polymers from Clariant. Other examples of ethylene/α-olefin interpolymers suitable for the invention include the ultra low molecular weight ethylene polymers described in U.S. Pat. Nos. 6,335,410, 6,054,544 and 6,723,810, each fully incorporated herein by reference.

In one embodiment, the composition comprises from "greater than 0" to 60 weight percent, further from 5 to 50 weight percent, and further from 10 to 50 weight percent, of component D, based on the weight of the composition.

In one embodiment, the weight ratio of component A to component D (A/D) is greater than, or equal to, 0.2, further greater than, or equal to, 0.3, and further greater than, or equal to, 0.5.

In one embodiment, the weight ratio of component A to component D (A/D) is greater than, or equal to, 1, further greater than, or equal to, 2, and further greater than, or equal to, 3.

In one embodiment, the weight ratio of component A to component D (A/D) is from 1 to 50, further from 1 to 40, and further from 1 to 30.

The ethylene/alpha-olefin interpolymer of component D may comprise a combination of two or more embodiments as described herein.

The ethylene/alpha-olefin copolymer of component D may comprise a combination of two or more embodiments as described herein.

Exemplary tackifying resins include, but are not limited to, aliphatic, cycloaliphatic and aromatic hydrocarbons, and modified hydrocarbons and hydrogenated versions; terpenes and modified terpenes and hydrogenated versions; and rosins and rosin derivatives and hydrogenated versions; and mixtures thereof. Suitable tackifiers include, but are not limited to, EASTOTAC H100 and EASTOTAC H115, each available from Eastman Chemical.

In one embodiment, the composition comprises from 10 to 60 weight percent, and further from 10 to 40 weight percent of the tackifier. In a further embodiment, the tackifier is a hydrocarbon, and further a hydrogenated hydrocarbon.

Waxes include, but are not limited to, paraffin waxes, microcrystalline waxes, high density, low molecular weight polyethylene waxes, polypropylene waxes, thermally degraded waxes, by-product polyethylene waxes, Fischer-Tropsch waxes, oxidized Fischer-Tropsch waxes, and functionalized waxes, such as hydroxy stearamide waxes and fatty amide waxes. It is common in the art to use the terminology "synthetic high melting point waxes" to include high density, low molecular weight polyethylene waxes, by-product polyethylene waxes and Fischer-Tropsch waxes. Other waxes also include those described in U.S. Pat. Nos. 6,335,410; 6,054,544 and 6,723,810; which are all incorporated herein by reference. Preferred waxes include, but are not limited to, SASOL waxes (e.g., SASOLWAX H1 from Sasol Wax Company), and Fischer-Tropsch waxes.

In one embodiment, the composition comprises from 10 to 60 weight percent, and further from 10 to 40 weight percent, and further from 10 to 30 weight percent of the wax.

In one embodiment, the composition comprises greater than, or equal to, 0.10 weight percent, further greater than, or equal to, 0.15 weight percent, and further greater than, or equal to, 0.20 weight percent of the anhydride and/or carboxylic acid functionality, based on the weight of the composition. In a further embodiment, the anhydride and/or carboxylic acid functionalized ethylene/alpha-olefin interpolymer is an anhydride and/or carboxylic acid functionalized ethylene/α-olefin copolymer.

In one embodiment, the composition has a melt viscosity at 177° C., from 500 to 1000 cP, further from 550 to 900 cP, and further from 600 to 800 cP.

An inventive composition may comprise a combination of two or more embodiments described herein.

The anhydride and/or carboxylic acid functionalized ethylene/alpha-olefin interpolymer of component A may comprise a combination of two or more embodiments described herein.

The tackifier of component B may comprise a combination of two or more embodiments described herein.

The wax of component C may comprise a combination of two or more embodiments described herein.

The ethylene/alpha-olefin interpolymer of component D may comprise a combination of two or more embodiments described herein.

The invention also provides an article comprising an inventive composition.

In a further embodiment, the article further comprises a substrate. In a further embodiment, the substrate is selected from the group consisting of the following: coated substrates, substrates made from recycled paper, and combinations thereof.

In a further embodiment, the substrate is selected from the group consisting of the following:
  (1) Wax coated Kraft or carton,
  (2) Polyethylene coated Kraft or carton,
  (3) BOPP film laminated Kraft or carton,
  (4) Polypropylene (PP) film laminated Kraft or carton,
  (5) PET film laminated Kraft or carton,
  (6) Clay coated Kraft or carton,
  (7) Lacquer coated Kraft or carton, and
  (8) Combinations thereof (for example, (1) followed by (2) or (1) or (4))

An inventive article may comprise a combination of two or more embodiments as described herein.

It has been discovered that the inventive compositions provide better overall adhesive performance, especially for bonding at a wide range of temperature (freezer to microwave), and flexibility, compared to conventional adhesives based on EVA and polyolefin.

Ethylene/α-Olefin Interpolymers (Based Polymers for Component A)

The base polymer used to form the anhydride and/or carboxylic acid functionalized ethylene/α-olefin interpolymer is an ethylene/α-olefin interpolymer.

The following embodiments also may apply to the ethylene/alpha-olefin copolymer of component D.

In one embodiment, the ethylene/α-olefin interpolymer, is an ethylene/α-olefin copolymer. Preferred α-olefins include, but are not limited to, C3-C20 α-olefins, and further C3-C10 α-olefins. More preferred α-olefins include propylene, 1-butene, 1-pentene, 1-hexene, 1-heptene and 1-octene, and more further include propylene, 1-butene, 1-hexene and 1-octene.

In one embodiment, the ethylene/α-olefin interpolymer has a melt viscosity less than, or equal to, 50,000 cP, further less than, or equal to, 40,000 cP, and further less than, or equal to, 30,000 cP, at 350° F. (177° C.). In a further embodiment, the ethylene/α-olefin interpolymer is an ethylene/α-olefin copolymer.

In one embodiment, ethylene/α-olefin interpolymer has a melt viscosity greater than, or equal to, 2,000 cP, further greater than, or equal to, 4,000 cP, more further greater than, or equal to, 5,000 cP, at 350° F. (177° C.). In a further embodiment, the ethylene/α-olefin interpolymer is an ethylene/α-olefin copolymer.

In one embodiment, the ethylene/α-olefin interpolymer has a melt viscosity from 2,000 cP to 20,000 cP, further from 4,000 cP to 16,000 cP, and further from 5,000 cP to 10,000 cP, at 350° F. (177° C.). In a further embodiment, the ethylene/α-olefin interpolymer is an ethylene/α-olefin copolymer.

In one embodiment, the ethylene/α-olefin interpolymer has a molecular weight distribution (Mw/Mn) less than, or equal to, 5, and further less than, or equal to, 4, and more further less than, or equal to, 3. Further the ethylene/α-olefin interpolymers have a molecular weight distribution from 1.1 to 3.5, and further from 1.1 to 3, and more further from 1.1 to 2.5. In a further embodiment, the ethylene/α-olefin interpolymer is an ethylene/α-olefin copolymer.

In one embodiment, the ethylene/α-olefin interpolymer has a melt index (I2 or MI), or calculated melt index (I2), greater than, or equal to, 500 g/10 min, further greater than, or equal to, 800 g/10 min, and more further greater than, or equal to, 1000 g/10 min. In a further embodiment, the ethylene/α-olefin interpolymer is an ethylene/α-olefin copolymer.

In one embodiment, the ethylene/α-olefin interpolymer has a percent crystallinity of less than, or equal to, 40 percent, further less than, or equal to, 30 percent, and more further less than, or equal to, 20 percent, as determined by DSC. In a further embodiment, the ethylene/α-olefin interpolymer is an ethylene/α-olefin copolymer.

In one embodiment, the ethylene/α-olefin interpolymer has a percent crystallinity of greater than, or equal to, 2 percent, further greater than, or equal to, 5 percent, and more further greater than, or equal to, 10 percent, as determined by DSC. In a further embodiment, the ethylene/α-olefin interpolymer is an ethylene/α-olefin copolymer.

In one embodiment, the ethylene/α-olefin interpolymer has a percent crystallinity from 2 to 30 percent, further from 5 to 25 percent, and more further from 10 to 20 percent, as determined by DSC. In a further embodiment, the ethylene/α-olefin interpolymer is an ethylene/α-olefin copolymer.

In one embodiment, the ethylene/α-olefin interpolymer has a percent crystallinity from 10 to 27 percent, further from 15 to 25 percent, and more further from 18 to 23 percent, as determined by DSC. In a further embodiment, the ethylene/α-olefin interpolymer is an ethylene/α-olefin copolymer.

In one embodiment, the ethylene/α-olefin interpolymer has a density greater than, or equal to, 0.855 g/cc, further greater than, or equal to, 0.860 g/cc, more further greater than, or equal to, 0.865 g/cc. In a further embodiment, the ethylene/α-olefin interpolymer is an ethylene/α-olefin copolymer.

In one embodiment, the ethylene/α-olefin interpolymer has a density less than, or equal to, 0.900 g/cc, further less than, or equal to, 0.895 g/cc, more further less than, or equal to, 0.890 g/cc. In a further embodiment, the ethylene/α-olefin interpolymer is an ethylene/α-olefin copolymer.

In one embodiment, the ethylene/α-olefin interpolymers has a density from 0.855 g/cm$^3$ to 0.900 g/cm$^3$, and further from 0.860 g/cm$^3$ to 0.895 g/cm$^3$, and more further from 0.865 g/cm$^3$ to 0.890 g/cm$^3$. In a further embodiment, the ethylene/α-olefin interpolymer is an ethylene/α-olefin copolymer.

In one embodiment, the ethylene/α-olefin interpolymers has a density from 0.870 g/cm$^3$ to 0.885 g/cm$^3$, and further from 0.872 g/cm$^3$ to 0.882 g/cm$^3$, and more further from 0.875 g/cm$^3$ to 0.880 g/cm$^3$. In a further embodiment, the ethylene/α-olefin interpolymer is an ethylene/α-olefin copolymer.

Some examples of ethylene/α-olefin copolymers include AFFINITY GA Polyolefin Plastomers, available from The Dow Chemical Company, and LICOCENE Performance Polymers from Clariant. Other examples of ethylene/α-olefin polymers suitable for the invention include the ultra low molecular weight ethylene polymers described in U.S. Pat. Nos. 6,335,410, 6,054,544 and 6,723,810, each fully incorporated herein by reference.

In one embodiment, the ethylene/α-olefin interpolymer is a homogeneously branched linear interpolymer, and further a copolymer, or a homogeneous branched substantially linear interpolymer, and further a copolymer.

In one embodiment, the ethylene/α-olefin interpolymer is a homogeneously branched linear interpolymer, and further a copolymer.

In one embodiment, the ethylene/α-olefin interpolymer is a homogeneous branched substantially linear interpolymer, and further a copolymer.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio.

The homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. These ethylene/α-olefin interpolymers have a linear polymer backbone, no measurable long chain branching, and a narrow molecular weight distribution. This class of polymers is disclosed, for example, by Elston in U.S. Pat. No. 3,645,992, and subsequent processes to produce such polymers, using bis-metallocene catalysts, have been developed, as shown, for example, in EP 0 129 368; EP 0 260 999; U.S. Pat. Nos. 4,701,432; 4,937,301; 4,935,397; 5,055,438; and WO 90/07526; each incorporated herein by reference. As discussed, the homogeneously branched linear ethylene interpolymers lack long chain branching, just as is the case for the linear low density polyethylene polymers or linear high density polyethylene polymers. Commercial examples of homogeneously branched linear ethylene/α-olefin interpolymers include TAFMER polymers from the Mitsui Chemical Company, and EXACT and EXCEED polymers from ExxonMobil Chemical Company.

The homogeneously branched substantially linear ethylene/α-olefin interpolymers are described in U.S. Pat. Nos. 5,272,236; 5,278,272; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone.

Some polymers may be substituted with 0.01 long chain branches per 1000 total carbons to 3 long chain branch per 1000 total carbons, further from 0.01 long chain branches per 1000 total carbons to 2 long chain branch per 1000 total carbons, and further from 0.01 long chain branches per 1000 total carbons to 1 long chain branch per 1000 total carbons.

The substantially linear ethylene/α-olefin interpolymers form a unique class of homogeneously branched ethylene polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene/α-olefin interpolymers useful in the invention have excellent processability, even though they have a relatively narrow molecular weight distribution. Surprisingly, the melt flow ratio (I10/I2), according to ASTM D 1238, of the substantially linear ethylene interpolymers can be varied widely, and essentially independently of the molecular weight distribution (Mw/Mn or MWD). This surprising behavior is contrary to conventional homogeneously branched linear ethylene interpolymers, such as those described, for example, by Elston in U.S. Pat. No. 3,645,992, and heterogeneously branched, conventional "Ziegler-Natta polymerized," linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the I10/I2 value also increases.

Long chain branching can be determined by using 13C Nuclear Magnetic Resonance (NMR) spectroscopy, and can be quantified using the method of Randall (Rev. Macromol. Chem. Phys., C29 (2&3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949), and Rudin, A., Modem Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

The ethylene/α-olefin interpolymer may comprise a combination of two or more embodiments as described herein.

The ethylene/α-olefin copolymer may comprise a combination of two or more embodiments as described herein.

Additives and Applications

Typically polymers and resins used in the invention are treated with one or more stabilizers, for example, antioxidants, such as IRGANOX 1010, IRGANOX 1076, and IRGAFOS 168, now supplied by BASF. Polymers are typically treated with one or more stabilizers before an extrusion or other melt processes. Other polymeric additives include, but are not limited to, ultraviolet light absorbers, antistatic agents, pigments and dyes, nucleating agents, fillers, slip agents, fire retardants, plasticizers, processing aids, lubricants, stabilizers, smoke inhibitors, viscosity control agents and anti-blocking agents. The inventive compositions may also contain one or more thermoplastic polymers.

The inventive compositions may further comprise an oil. Oils are typically employed to reduce the viscosity of the adhesive. When employed, oils will be typically present in an amount less than 50, preferably less than 40, and more preferably less than 35 weight percent, based on the weight of the adhesive formulation. Exemplary classes of oils include, but are not limited to, white mineral oil (such as KAYDOL oil available from Witco), and SHELLFLEX 371 naphthenic oil (available from Shell Oil Company) and CALSOL 5550(napthenic oil from Calumet Lubricants).

The inventive compositions may be prepared by standard melt blending procedures. In particular, the maleic anhydride-grafted polymer or blend, tackifier(s) and other components may be melt blended until a homogeneous mix is obtained. Any mixing method producing a homogeneous blend, without degrading the adhesive components, is satisfactory, such as a vessel equipped with a stirrer, and an optional heating mechanism. The adhesives can be provided in forms, such as pellets, pillows, chiclets, drages or any other desired configurations.

The inventive compositions may also be used in a variety of application, including, but not limited to, case and carton sealing, automotive, graphic arts, nonwovens, panel assembly, high performance tapes, contact hot melt adhesives, paperboard coatings, inks, personal care and cosmetic products, sealants, color and additive concentrates, carpet-tape adhesives, woodworking adhesives, and profile wrap adhesives.

Definitions

Unless stated to the contrary, all test methods are current as of the filing date of this disclosure.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, for example, catalyst residues, may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Melt Viscosity

Melt viscosity is measured in accordance with ASTM D 3236 (350° F.), using a Brookfield Digital Viscometer (Model DV-III, version 3), and disposable aluminum sample chambers. The spindle used, in general, is a SC-31 hot-melt spindle, suitable for measuring viscosities in the range from 10 to 100,000 centipoise. The sample is poured into the chamber, which is, in turn, inserted into a Brookfield Thermoset, and locked into place. The sample chamber has a notch on the bottom that fits the bottom of the Brookfield Thermoset, to ensure that the chamber is not allowed to turn when the spindle is inserted and spinning. The sample (approximately 8-10 grams of resin) is heated to the required temperature, until the melted sample is about one inch below the top of the sample chamber. The viscometer apparatus is lowered, and the spindle submerged into the sample chamber. Lowering is continued, until the brackets on the viscometer align on the Thermoset. The viscometer is turned on, and set to operate at a shear rate which leads to a torque reading in the range of 40 to 60 percent of the total torque capacity, based on the rpm output of the viscometer. Readings are taken every minute for about 15 minutes, or until the values stabilize, at which point, a final reading is recorded.

Melt Index

Melt index (I2, or MI) of an ethylene-based polymer is measured in accordance with ASTM D-1238, condition 190° C./2.16 kg. For high I2 polymers (I2 greater than, or equal to, 200 g/mole, melt index is preferably calculated from Brookfield viscosity as described in U.S. Pat. Nos. 6,335,410; 6,054,544; 6,723,810. I2(190° C./2.16 kg)=$3.6126[10^{(log(\eta)-6.6928)/-1.1363}]-9.31851$, where η=melt viscosity, in cP, at 350° F.

Peel and Shear Strength

The peel adhesion failure temperature (PAFT) and shear adhesion failure temperature (SAFT) of the HMA were tested using ASTM D-4498. Four samples were put in a programmable oven, then "100 g weights" for PAFT, and "500 g weights" for SAFT, were attached to the samples. The test samples were equilibrated in an oven at 30° C., then the temperature of the oven was increased at a heating rate of 0.5° C./min The failure time was recorded, and the failure temperature was calculated accordingly.

Two sheets of 6"×12" Kraft paper were used for lamination. Bottom sheet has two pieces of masking tape separated by 1" gap. The adhesive was spread by the bottom glass rod that is shimmed with tape. The top glass rod supplies compression. Silicone paper at the end was to catch the excess adhesive. The final bond was defined by the two pieces of masking tape and was 1" wide. The molten adhesive was heated to 177° C., and poured onto the bottom sheet. The glass rods were then quickly drawn across to make the lamination. The laminated sheet was trimmed, and cut widthwise into "1" wide strips." These strips had a "1"×1" bond" in the center. The samples were conditioned for 24 hours at room temperature and 54 percent RH (Relative Humidity). Then the samples were placed in the oven, with 100 g in a peel mode, and 500 g in a shear mode. The oven temperature was increased at a rate of 30° C./h. The samples were hung from a switch that tripped when the samples failed, and the time and temperature were recorded by a computer.

Heat Stress

The heat stress resistance was measured according to the "Suggested Test Method for Determining the Heat Stress Resistance of Hot Melt Adhesives," method T-3006, prepared by the Institute of Packaging Professions (IoPP). To prepare one sample, two cardboard coupons (cut with flutes running in the long direction) having dimensions of 2"×3³⁄₁₆" and 2"×5½" were bonded, by applying "0.00014 lb/in of adhesive" with an Olinger Bond Tester. The adhesive was applied perpendicular to the flutes, in the center of the shorter coupon, and the coupons were bonded, such that the adhesive was ¾" from one end of the long coupon. Five replicates were made for each formulation. Samples were loaded into the sample holder, with the short coupon end aligned with the edge of the sample holder. The samples were held in place with the wide plate secured by wingnuts. A "200 g weight" was placed 3.94" from the bond. The weight was secured by placing the peg, on the weight, into a hole made in the long coupon. The sample holder was then placed into a convection oven, at a set temperature, for 24 hours. If at least 80% of the bonds do not fail, than the sample was considered to have passing heat resistance at the test temperature. The oven temperature was varied, until the maximum passing heat stress resistance was determined All new bonded coupon samples were used for each test temperature.

Fiber Tear

The percentage of fiber tear of each adhesive sample was evaluated on regular cardboard and hard to bond substrates at three different temperatures: room temperature, −17° C. and 60° C. The fiber tear results on these two different substrates were recorded. The adhesive was heated to 350° F./177° C., and was applied on the substrate cut into "1×3 in (25×76 mm)" rectangular sheets. The adhesive to be tested was applied, running lengthwise, as about a "5 mm/0.2 in" wide strip, and was drawn down with a spatula or hot melt applicator. Then a second strip was applied within two seconds and held, with moderate pressure, for five seconds to laminate.

The bonds conditioned for 24 hours at room temperature and 54 percent RH, were then pulled apart at the test temperatures of room temperature, −17° C. and 60° C. Each bond was tested immediately, after the conditioning period ended. The bond was torn by inserting the blade of a spatula under one corner to fold up the corner. The bond was then placed on a horizontal surface, with the side with the folded corner faced up. With the laminate held as near as possible to the source of heating or cooling in order to maintain the conditioning temperature, the folded corner is manually pulled as rapidly, as possible, at roughly a 45 to 90 degree angle, relative to each sheet's lengthwise axis, to tear the adhesive bond. The percent of torn fiber was estimated (fiber tear or FT) in 25 percent increments; that is, 0 percent, 25 percent, 50 percent, 75 percent and 100 percent. Unless otherwise stated, the FT test is normally repeated on five replicate samples, and the average of these five runs reported.

Gel Permeation Chromatography

The average molecular weights and molecular weight distributions for ethylene-base polymers are determined with a chromatographic system, consisting of either a Polymer Laboratories Model PL-210 or a Polymer Laboratories Model PL-220. The column and carousel compartments are operated at 140° C. for ethylene-based polymers. The columns are three Polymer Laboratories 10-micron, Mixed-B columns The solvent is 1,2,4 trichlorobenzene. The samples are prepared at a concentration of "0.1 gram of polymer' in "50 milliliters" of solvent. The solvent used to prepare the samples contains 200 ppm of butylated hydroxytoluene (BHT). Samples are prepared by agitating lightly for two hours at 160° C. The injection volume is "100 microliters," and the flow rate is 1.0 milliliters/minute. Calibration of the GPC column set is performed with narrow molecular weight distribution polystyrene standards, purchased from Polymer Laboratories (UK). The polystyrene standard peak molecular weights are converted to polyethylene molecular weights using the following equation (as described in Williams and Ward, J. Polym. Sci., Polym. Let., 6, 621 (1968)):

$$M_{polyethylene} = A \times (M_{polystyrene})^B,$$

where M is the molecular weight, A has a value of 0.4315 and B is equal to 1.0. Polyethylene equivalent molecular weight calculations were performed using VISCOTEK TriSEC software Version 3.0. The molecular weights for polypropylene-based polymers can be determined using Mark-Houwink ratios according to ASTM D6474.9714-1, where, for polystyrene a=0.702 and log K=−3.9, and for polypropylene, a=0.725 and log K=−3.721. For polypropylene-based samples, the column and carousel compartments are operated at 160° C.

DSC

Differential Scanning calorimetry (DSC) is used to measure crystallinity in polyethylene (PE) based samples and polypropylene (PP) based samples. About five to eight milligrams of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (e.g., for PE, % cryst.=($H_f$/292 J/g)×100; and for PP, % cryst.=($H_f$/165 J/g)×100).

Unless otherwise stated, melting point(s) ($T_m$) of each polymer is determined from the second heat curve obtained from DSC, as described above. The crystallization temperature ($T_c$) is measured from the first cooling curve.

Density

Density is measured in accordance with ASTM D-792. The density measured was a "quick density," meaning that the density was determined after one hour from the time of molding.

Fourier Transform Infrared Spectroscopy (FTIR) Analysis—Maleic Anhydride Content.

The concentration of maleic anhydride is determined by the ratio of peak heights of the maleic anhydride at wave number 1791 cm$^{-1}$ to the polymer reference peak, which, in case of polyethylene, is at wave number 2019 cm$^{-1}$. Maleic anhydride content is calculated by multiplying this ratio with the appropriate calibration constant. The equation used for maleic grafted polyolefins (with reference peak for polyethylene) has the following form, as shown in Equation 1.

MAH(wt %)=$A$*{[FTIR PeakArea@1791cm−1]/
[FTIR PeakArea2019cm−1+$B$*
[$FTIR$ $PeakArea$@1712cm−1]/
FTIR_PeakArea@2019cm−1]}    (Eqn. 1)

The calibration constant A can be determined using C13 NMR standards. The actual calibration constant may differ slightly depending on the instrument and polymer. The second component at wave number 1712 cm$^{-1}$ accounts for the presence of maleic acid, which is negligible for freshly grafted material. Over time however, maleic anhydride is readily converted to maleic acid in the presence of moisture. Depending on surface area, significant hydrolysis can occur in just a few days under ambient conditions. The acid has a distinct peak at wave number 1712 cm$^{-1}$. The constant B in Equation 1 is a correction for the difference in extinction coefficients between the anhydride and acid groups.

The sample preparation procedure begins by making a pressing, typically 0.05 to 0.15 millimeters in thickness, in a heated press, between two protective films, at 150-180° C. for one hour. Mylar and Teflon are suitable protective films to protect the sample from the platens. Aluminum foil must never be used (maleic anhydride reacts with aluminum). Platens should be under pressure (~10 ton) for about five minutes. The sample is allowed to cool to room temperature, placed in an appropriate sample holder, and then scanned in the FTIR. A background scan should be run before each sample scan, or as needed. The precision of the test is good, with an inherent variability of less than ±5%. Samples should be stored with desiccant to prevent excessive hydrolysis. Moisture content in the product has been measured as high as 0.1 weight percent. The conversion of anhydride to acid however is reversible with temperature, but may take up to one week for complete conversion. The reversion is best performed in a vacuum oven at 150° C.; a good vacuum (near 30 inches Hg) is required. If the vacuum is less than adequate the sample tends to oxidize resulting in an infrared peak at approximately 1740 cm$^{-1}$, which will cause the values for the graft level to be too low. Maleic anhydride and acid are represented by peaks at about 1791 and 1712 cm$^{-1}$, respectively.

Flex Mandrel

Flex Mandrel testing was completed according to the Mandrel Bend Test Method (ASTM D3111-99). Test strips were "1 cm wide by 1.5 mm thick" adhesive strips, which were bent over a mandrel (diameters of 3 mm, 6 mm, and 15 mm) The test was repeated with a smaller diameter mandrel, until the adhesive failed on bending. The flexibility of the adhesive is indicated by the smallest diameter, over which 4 out of 5 specimens did not break. Testing was performed at various temperatures. Results at each mandrel diameter may be reported as the percentage of test strips that did not fail.

The polymers, compositions and processes of this invention, and their use, are more fully described by the following examples. The following examples are provided for the purpose of illustrating the invention, and are not to be construed as limiting the scope of the invention.

EXPERIMENTAL

Materials

The materials used in this study are listed in Table 1.

The tackifier was fully hydrogenated hydrocarbon EASTOTAC H115, supplied by Eastman Chemical Company.

The wax used was SASOLWAX H1. SASOLWAX H1 is a Fischer-Tropsch wax, supplied by Sasol Wax.

IRGANOX 1010 (I1010) was used as antioxidant.

TABLE 1

Polymers used in the Experimental Adhesive (HMA) Formulations

| Polymer | Calculated I2* at 190° C. (g/10 min) | Melt Viscosity at 177° C. (cP) | Density (g/cm3) | MAH (wt %) | Mw$^a$ (g/mol) | Mn$^a$ (g/mol) | Mw/Mn$^a$ |
|---|---|---|---|---|---|---|---|
| EO 19$^b$ | 1000 | 8200 | 0.870 | N/A** | 20000 | 9523 | 2.1 |
| EO 07$^c$ | 660 | 13000 | 0.878 | 0.7-1.5 | | | |

$^a$GPC results.
$^b$Homogeneously branched ethylene/octene copolymer (e.g., AFFINITY GA 1900).
$^c$MAH-g-homogeneously branched ethylene/octene copolymer.
*Melt index may be calculated from the following equation (See U.S. Pat. No. 6,335,410): I2(190° C./2.16 kg) = $3.6126[10^{(log \eta)^{-6.6928)/-1.1363}}] - 9.31851$, where $\eta$ = melt viscosity, in cP, at 350° F.
**Not Applicable.

Preparation of EO 07

Low MW Ethylene-octene copolymer with a viscosity range of 6,000 to 17,000 cps measured at 350° F. using a Brookfield viscosity. Nominal 1000 MI (calculated), 0.87 g/cc density ethylene-octene copolymer.

Maleic Anhydride (MAH—DeGussa DHBP or equivalent)

Hydrobrite 380—hydrotreated paraffinic oil to dilute peroxide as needed. (1:1 ratio of peroxide: oil).

Luperox 101—2,5-Bis(tert-butylperoxy)-2,5-dimethylhexane (290.44 g/mol).

Barrel, Gear Pump, and Die Temperature settings:
Feed barrel—cooling (49° C.)
Barrel #3: 120° C., injection of maleic at injection port 3a and peroxide at port 4a
Barrel #4—11: 235° C.
Transfer lines and Gear pump: 150° C.
Die: 204° C.
Screw Speed 386 rpm
MAH 16.25 lb/hr
MAH % Feed 1.55%
"1:1 Oil:PDX" 3.6 lb/hr
"1:1 Oil:PDX" % Feed 0.34%
Pure PDX Feed 0.17%
Vac. Pressure 20 cm Hg EO 07 (see Table 1) was made on a "92 mm" co-rotating twin screw extruders (TSE). The process is summarized in the following steps: (a) the TSE was set to run at the selected barrel temperature profiles, and the screw speeds set to the desired RPMs; (b) polymer pellets were fed into the extruder hopper of the extruder by a gravimetrically, controlled auger feeder, at the desired polymer feed rate; (c) molten MAH was injected into the barrel; (d) peroxide was added via a 1:1 mineral oil solution, at a target feed rate, and injected into the barrel, downstream from the MAH; (e) kneading blocks distributed the reactive ingredients and heated the polymer melt through mechanical energy dissipation, and the reaction occurred following thermal decomposition of peroxide initiator; (f) volatile unreacted components and byproducts were removed at a vacuum port; (g) the melt was cooled in the final barrel section and fed to a gear pump; (h) the gear pump fed a die, from which the melt went to an underwater pelletizer. A pellet slurry cooling line of sufficient length was used to achieve residence time greater than 60 seconds, to cool pellets to less than 25° C.). The pelletized product was dried and collected. MAH content greater than, or equal to, 0.9 weight percent.

HMA Formulations

Components for the adhesive compositions were weighed into an aluminum container, and preheated in an oven, at 180° C., for one hour. The components in the container were then mixed in a heated block at 180° C. for 30 minutes, with a "Paravisc style" mixer head at 100 RPM. Each adhesive composition contained the following: polymer, wax, and tackifier resin.

Substrates

A total of five "hard-to-bond" substrates (Substrates 1-5) were examined.

Substrate 1: A polypropylene coated Kraft beverage container
Substrate 2: Coated Cardboard: Wax coated cardboard
Substrate 3: A printer paper wrap coated with a wax, followed by a polypropylene coating
Substrate 4: A paraffinic wax coated Flour Bag
Substrate 5: A paraffinic wax coated Maze Meal Bag Regular Standard Inland cardboard (regular cardboard) was also used in some of the adhesive tests.

Test Results

The following tests were used: a) Application Viscosity at 177° C.; b) Heat Stress Resistance; c) PAFT and SAFT; d) Fiber Tear on regular cardboard at RT, −17° C. and 60° C.; and e) Fiber Tear on Substrate 1 at RT, −17° C. and 60° C.

Table 2 shows the properties of the HMA formulations used in this study, including test results performed with the "hard to bond" Substrate 1. These model formulations, with 40 wt % of total polymer component(s), were tested, as the functional polymer content was gradually increased from 0 to 40 wt % in "10 wt %" increments. These formulations were applied on the regular cardboard and the "hard to bond" Substrate 1 at 177° C. The viscosities of all these formulations were from 500 to 1500 cps, a requirement for optimal dispensing of the hot melt adhesive.

The incumbent EVA-based adhesive was shown to have very limited adhesion on the difficult to bond substrate at room temperature and freezer temperature. It could only achieve 34%, and almost 0%, fiber tears, at −17° C. and room temperature, respectively. The EO 19-based adhesive, without MAH grafting, had marginal bonding on regular cardboard at −17° C. and 60° C. Furthermore, this adhesive also failed on the "hard to bond" substrate, with fiber tear around 60% at both temperatures. Substituting 10 wt % of EO 19 with EO 07, significantly increased the adhesion on hard to bond substrate. Heat stress also benefited, along with increased adhesion. The highest heat stress value was achieved with 30 wt % and 40 wt % of EO 07 in the formulation (passing the 60° C. heat stress test). Though the PAFT and SAFT results did not follow the same trend observed in heat stress tests, the heat stress tests is considered to reflect a more realistic rendering of real life, heat load on the container flaps (the portion of the container to which the adhesive is applied, and after which, are then sealed to the container).

Overall, compared with incumbent EVA-based and EO 19-based adhesives, the adhesives containing EO 07 showed a significant improvement on adhesive properties, such as heat stress resistance, fiber tear on regular cardboard, and fiber tear on the "hard to bond" Substrate 1. The compositions containing 20 wt %, 30 wt % and 40 wt % of EO 07, were good enough to ensure commercial success on such substrates.

were examined. The first formulation was composed of 40 wt % of EO 19 and 10 wt % of A-0575P (Honeywell A-C 575P Ethylene Maleic Anhydride Copolymer). The second formulation was composed of 20 wt % of EO 19 and 20 wt % of EO 07. Both formulations contained a similar content of "0.20-0.22 wt % of MAH groups," either from functionalized polymer (EO 07) or a functionalized wax (A-0575P). See Table 4 below.

Formulation 1 (F1) contained 10 wt % of A-C 575P. The total MAH content from wax in F1 is 0.203 wt %.

Formulation 2 (F2) contained 20 wt % of EO 07. The total MAH content MAH-g-polymer in F2 is 0.22 wt %.

F1: 40 wt % EO 19, 10 wt % A-0575P (fn wax), 15 wt % SASOLWAX H1, 35 wt % EASTOTAC H115, 0.5 wt % H010.

TABLE 2

Adhesive Properties

| 40 wt % Polymer (EVA, EO 19, or EO 19 and EO 07) 35 wt % EASTOTAC H115 25 wt % SASOL-WAX H1 0.5 wt % ppm I1010 | Melt Viscosity @177° C., (cP) | SAFT (° C.) | PAFT (° C.) | Fiber Tear (%) Substrate 1 | | | Fiber Tear (%) Regular Cardboard | | | Heat Stress Resistance Regular Cardboard (failure = cohesive) | | | |
|---|---|---|---|---|---|---|---|---|---|---|---|---|---|
| | | | | -17° C. | RT | 60° C. | -17° C. | RT | 60° C. | 50° C. | 55° C. | 60° C. | 65° C. |
| EVA | | | | 34 | 5.4 | 100 | | | | | | | |
| EO 19 | 593 | 91.7 | 57.1 | 62 | 66 | 96 | 75 | 100 | 67 | 5 | 3 | | |
| 5 wt % EO 07 + 35 wt % EO 19 | 590 | 92.4 | 57.9 | 71 | 59 | 82 | 100 | 100 | 98 | 6 | 1 | | |
| 10 wt % EO 07 + 30 wt % EO 19 | 591 | 91.7 | 57.8 | 75 | 100 | 96 | 100 | 100 | 100 | | 5 | 0 | |
| 20 wt % EO 07 + 20 wt % EO 19 | 602 | 91.3 | 57.3 | 100 | 100 | 99 | 100 | 100 | 100 | 6 | 3 | | |
| 30 wt % EO 07 + 10 wt % EO 19 | 602 | 90.7 | 57.7 | 100 | 90 | 87 | 80 | 100 | 90 | | | 4 | 2 |
| 40 wt % EO 07 + 0 wt % EO 19 | 713 | 93.3 | 59.5 | 94 | 100 | 100 | 100 | 100 | 100 | | 5 | 1 | |

Table 3 below indicates the test results using the optimum formulation as based on results with the Substrate 1. The EO 19-based formulation performed equally as well as the formulation containing EO 07, at room temperature and elevated temperatures. At freezer temperature, the "EO 07 formulation" clearly performed much better.

TABLE 3

Adhesive Properties

| 40 wt % Polymer (EO 19, or EO 19 and EO 07) & 35 wt % EASTOTAC H115 25 wt % SASOLWAX H1 0.5 wt % ppm I1010 | Substrate | Fiber Tear (%) | | |
|---|---|---|---|---|
| | | -25° C. | RT | 60° C. |
| EO 19 | 2 | 27 | 100 | 97 |
| 8 wt % EO 07 + 32 wt % EO 19 | 2 | 77 | 100 | 100 |
| 40 wt % EO 19 | 3 | 60 | 100 | 100 |
| 8 wt % EO 07 + 32 wt % EO 19 | 3 | 100 | 100 | 100 |
| 40 wt % EO 19 | 4 | 6 | 55 | 88 |
| 8 wt % EO 07 + 32 wt % EO 19 | 4 | 38 | 67 | 78 |
| 40 wt % EO 19 | 5 | 3 | 92 | 93 |
| 8 wt % EO 07 + 32 wt % EO 19 | 5 | 75 | 93 | 100 |

Formulations with EO 07 and MAH Grafted Wax

To further understand the performance differences between different MAH grafted solutions, two formulations F2: 20 wt % EO 19 and 20 wt % EO 07, 25 wt % SASOLWAX H1, 35 wt % EASTOTAC H115, 0.5 wt % I1010.

TABLE 4

MAH content in Formulations F1 and F2

| | MAH Content (wt %) | Amount of the functionalized component in the adhesive formulation (wt %) | Total MAH (wt %) |
|---|---|---|---|
| F1 | 2.03 | 10 (A-C 575P) | 0.203 |
| F2 | 1.1 | 20 (EO 07) | 0.22 |

As shown in Table 5, with the same MAH content in F2, the composition containing the MAH grafted polymer (EO 07), had an overall better performance than the composition containing the grafted wax, especially for high temperature adhesion, heat stress and flexibility properties. Compared with composition containing the A-C 575P, the composition containing the EO 07 demonstrated a "7.5° C." increase in heat stress performance. F2 also outperformed in flex mandrel (a test that measures the flexibility of the adhesive at different temperatures) at both room temperature and freezer temperature.

TABLE 5

Performances of EO 07 vs. MAH Grafted Wax

| | Melt Viscosity @177° C. | SAFT ° C. | PAFT ° C. | Fiber Tear US Cardboard | | | Heat Stress* | |
|---|---|---|---|---|---|---|---|---|
| | | | | −17° C. | RT | 60° C. | 50° C. | 55° C. |
| 40 wt % EO 19, 10 wt % A-C575P, 15 wt % SASOLWAX H1, 35 wt % EASTOTAC H100, 0.5 wt % I1010 | 909 | 69 | 42 | 100 | 100 | 70 | 4 | 2 |
| 20 wt % EO 19, 20 wt % EO 07, 25 wt % SASOLWAX H1, 35 wt % EASTOTAC H100, 0.5 wt % I1010 | 789 | 83 | 50 | 100 | 100 | 92 | 6 | 5 |

| | Heat Stress* | | Flex Mandrel (3 mm) | | Flex Mandrel (6 mm) | | Flex Mandrel (15 mm) | |
|---|---|---|---|---|---|---|---|---|
| | 57.5° C. | 60° C. | RT | −18° C. | RT | −18° C. | RT | −18° C. |
| 40 wt % EO 19, 10 wt % A-C575P, 15 wt % SASOLWAX H1, 35 wt % EASTOTAC H100, 0.5 wt % I1010 | | | 20 | 0 | 60 | 40 | 100 | 100 |
| 20 wt % EO 19, 20 wt % EO 07, 25 wt % SASOLWAX H1, 35 wt % EASTOTAC H100, 0.5 wt % I1010 | 4 | 2 | 100 | 100 | 100 | 100 | 100 | 100 |

*Number of coupons that passed the test. Minimum required acceptance for Heat Stress is four coupons.

Table 6 lists another adhesive formulation, F3. As seen in Table 6, the F3 composition had a very high melt viscosity, and therefore cannot be used in conventional hot melt adhesive processes. In contrast, F2 composition (see above) had an acceptable melt viscosity.

F3: 22 wt % EO 19, 18 wt % AMPLIFY GR 204, 25 wt % SASOLWAX H1, 35 wt % EASTOTAC H100, 0.5 wt % I1010.

TABLE 6

Formulations F3 and F2

| | MAH content (wt %) | Amount of the functionalized component in the adhesive formulation (wt %) | Total MAH (wt %) | Viscosity at 177° C. (cP) |
|---|---|---|---|---|
| F3 | 1.2 | 18 (GR204) | 0.22 | 4,649 |
| F2 | 1.1 | 20 (EO 07) | 0.22 | 593 |

SUMMARY OF RESULTS

Overall, the adhesive compositions containing EO 07 showed significant improvements in overall adhesive properties, such as, for example, heat stress, fiber tear on regular cardboard, fiber tear on Substrate 1 (hard to bond substrate). Compositions containing 20 wt %, 30 wt %, and 40 wt % of EO 07, were good enough to ensure commercial success on such substrates. Compared with incumbent MAH-g wax, EO 07 brings overall better performances, especially for high temperature adhesion, heat stress, and flexibility. The inventive compositions also had low melt viscosities, acceptable for hot melt adhesive processes.

The invention claimed is:
1. A composition comprising the following:
   A) a maleic anhydride grafted ethylene/octene copolymer having the following properties:
      i) a melt viscosity (177° C.) from 13,000 cP to 15,000 cP,
      ii) MWD from 1.5 to 3.0, and
      iii) a density from 0.865 g/cc to 0.890 g/cc;
   B) 35 weight percent, based on the weight of the composition, of a hydrogenated hydrocarbon tackifier;
   C) 25 weight percent, based on the weight of the composition, of a Fischer-Tropsch wax; and
   D) an ethylene/octene copolymer; and wherein the ethylene/octene copolymer of component D has the following properties:
      i) a melt viscosity (177° C.) from 5,000 cP to 10,000 cP,
      ii) MWD from 1.7 to 2.5,
      iii) a density from 0.865 to 0.890 g/cc; and
      wherein the ethylene/octene copolymer comprises, in polymerized form, a majority amount of ethylene monomer (based on the weight of the copolymer), and octene, as the only two monomer types; and
   wherein the composition has a heat stress resistance pass rate of 80% on regular cardboard at 60° C.; and
   wherein the maleic anhydride grafted ethylene/octene copolymer of component A is a maleic anhydride grafted homogeneously branched ethylene/octene copolymer; and the ethylene/octene copolymer of component D is a homogeneously branched ethylene/octene copolymer; and
   wherein the sum of component A and component D comprise 40 weight percent of the composition and a weight ratio of component A to component D is 3.
2. The composition of claim 1, wherein the maleic anhydride grafted ethylene/octene copolymer has a weight average molecular weight (Mw) from 4,000 to 30,000 g/mole.

3. An article comprising the composition of claim 1.

4. The article of claim 3, further comprising a substrate.

5. The article of claim 4, wherein the substrate is selected from the group consisting of the following: a coated substrate, a recycled paper, and combinations thereof.

6. The article of claim 4, wherein the substrate is selected from the group consisting of the following: wax coated Kraft or carton, polyethylene coated Kraft or carton, BOPP film laminated Kraft or carton, polypropylene (PP) film laminated Kraft or carton, PET film laminated Kraft or carton, clay coated Kraft or carton, lacquer coated Kraft or carton, and combinations thereof.

7. The composition of claim 1, wherein the ethylene/octene copolymer of component D has a melt index (I2) greater than, or equal to, 400 g/10 min.

8. The composition of claim 1 having a fiber tear (regular cardboard) of 100% at room temperature.

* * * * *